Patented Jan. 1, 1952

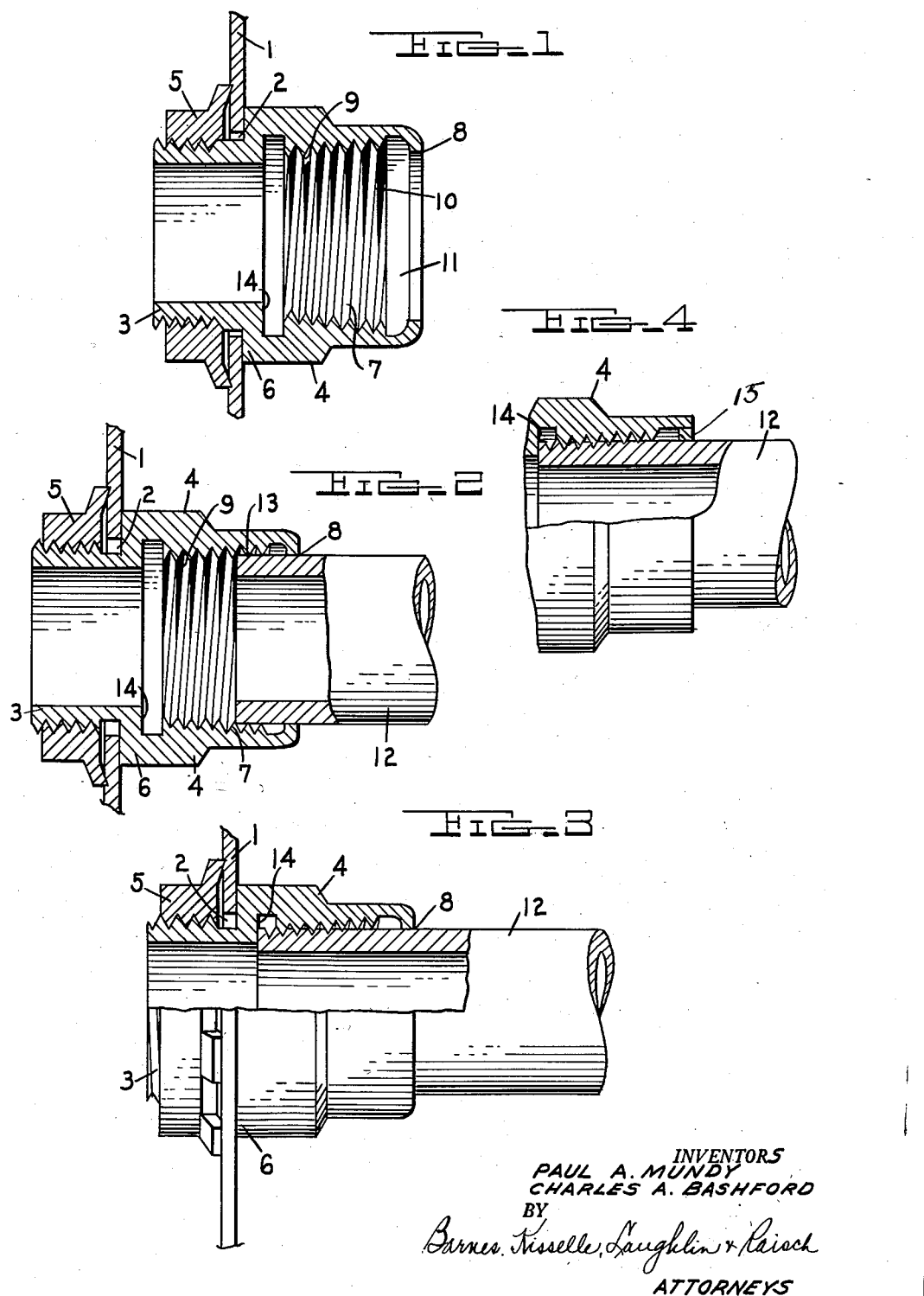

2,580,818

UNITED STATES PATENT OFFICE 2,580,818

CONNECTOR FOR CONDUITS

Paul A. Mundy and Charles A. Bashford, Detroit, Mich.; said Mundy assignor to said Charles A. Bashford, Detroit, Mich., doing business as Bashford Machine Company Application May 1, 1948, Serial No. 24,518

7 Claims. (Cl. 285—6.5)

This invention relates to a connector for a conduit.

In the electrical field it is common practice to enclose the wires in thin wall conduits. Heretofore it has been the practice to connect the end of the conduit to the outlet box by means of a clamp type coupling which fits into the outlet box and clamps the end of the conduit thereto. This method of assembling the conduit to the outlet box is slow and expensive.

It is an object of this invention to produce a connector for thin wall conduits, such as are used in the electrical field for carrying wires, which effects considerable economy in installation because of the facility with which the conduit can be connected to the connector and which has a strong and durable connection with the conduit.

With our connector the conduit can be cut to any length desired and then screwed directly into the connector without previously threading the end of the conduit which is to be interengaged with the coupling. This purpose is accomplished by providing the coupling with an internal tapered thread and a rolled edge, the tapered thread cutting its own thread in the unthreaded end of the conduit and the rolled edge cooperating with the tapered thread to axially align the conduit with the connector. The rolled edge also cooperates with the internal threads to effect a strong support between the connector and the conduit so that any stresses upon the conduit transversely of its longitudinal axis are distributed over the end of the conduit rather than concentrated at any one point or line.

Fig. 1 is a longitudinal section showing our connector assembled to the wall of an outlet box.

Fig. 2 is a section showing a conduit having an end inserted in the connector and axially aligned therewith preparatory to screwing the conduit into the connector.

Fig. 3 is a sectional view similar to Fig. 2 but showing the conduit turned into final assembled relation with the connector.

Fig. 4 is a sectional view showing a modified form of connector.

Referring more particularly to the drawings there is shown a portion of a wall 1 of an outlet box provided with an opening 2 through which the reduced threaded end of our connector 4 has been passed and secured therein by a nut 5 which has been turned down to thereby securely clamp wall 1 between shoulder 6 and nut 5.

Our coupling 4 is internally threaded as at 7 with a tapered thread such, for example, as a standard Morse pipe taper of about three-quarters of an inch per foot. The edge 8 of the inlet opening to our connector 4 has a diameter which is greater than the crest to crest diameter of the innermost convolution 9 of tapered thread 7 but which is less than the crest to crest diameter of the outermost convolution 10 of thread 7. Since thread 7 has a standard Morse pipe taper, therefore the crest to crest diameter of outermost convolution 10 will be greater than the corresponding inner diameter of convolution 9. This relation of the diameters above set forth is important.

Edge 8 is preferably rolled to size following the cutting of tapered thread 7 in our connector 4. It should also be noted that edge 8 is preferably spaced axially from the outermost or starting end of thread 7. In a three-quarter inch fitting this spacing, generally designated 11, is preferably about one-eighth of an inch. The importance of the relative size of the diameters, above described, is illustrated in Fig. 2, which shows an end of the thin wall metal or plastic conduit 12 inserted in the coupling 4 and ready to be turned into the final position illustrated in Fig. 3.

As shown in Fig. 2, it will be noted that the conduit 12 rests upon the inner circumference of edge 8 and also engages the crest circumference of about the second convolution 13 of tapered thread 7. Thus, conduit 12 is supported around two spaced circumferential areas and since the inner circumference of edge 8 is concentric with tapered thread 7, therefore this two point suspension or contact of conduit 12 in coupling 4 assures axial or longitudinal alignment of conduit 12 with coupling 4. The conduit 12, while held in the position illustrated in Fig. 2, is simultaneously pushed to the left and turned into coupling 4 whereupon tapered thread 7 cuts its own thread into the outer surface of conduit 12. Conduit 12 is preferably turned into coupling 4 until its end abuts internal shoulder 14.

In the final assembled relation of the conduit 12 in connector 4, it will be noted that the conduit 12 has a snug supporting fit with the rolled edge 8 of connector 4 and also a spaced screw fit with the tapered thread portion 7 of the connector. Thus, any bending stresses applied to conduit 12 will not be concentrated at any one point but will be distributed over the area between rolled edge 8 and tapered thread 7.

From the above it is evident that our connector expedites and facilitates the assembly of metal or plastic conduits thereto and that it provides a strong and rigid support therefor.

When the thin wall tubing is turned into connector 4, the connector bites into the thin wall tubing and therefore provides a good ground or electrical circuit between the tube and connector. It is quite common to ground the outlet box 1 to the water supply pipe leading into the conventional house.

In Fig. 4 there is illustrated a form of connector in which the edge of the entrance to the connector is not integral with the connector but formed of a separate ring 15 having a press fit in the entrance end of the connector 4. Ring 15 will have the same circumference as the rolled or stamped edge 8.

We claim:

1. A connector adapted for connecting a tubular conduit to a supporting structure, such as an outlet box, comprising a tubular member having means thereon for attaching it to said supporting structure and also having an internal thread substantially uniformly tapered axially of said member, the starting turn of said thread being spaced from one end of said connector into which a conduit is adapted to be inserted, the internal diameter of said end of the connector being smaller than the crest diameter of the adjacent starting turn of said tapered thread and greater than the crest diameter of the turn of said tapered thread remote from said end whereby when a conduit is screwed into said connector said end cooperates with said tapered thread to provide a two point suspension for said conduit.

2. A connector adapted for connecting a tubular conduit to a supporting structure, such as an outlet box, comprising a tubular member having means thereon for attaching it to said structure and also having an internal helical thread substantially uniformly tapered axially of said member, the diameter of said helical thread decreasing axially inwardly from one end of said connector, the said end of said connector being adapted to receive the end portion of a conduit and having a circumferential pilot edge which serves as a pilot for guiding the conduit to said thread, said circumferential pilot edge having a diameter which is less than the crest diameter of the portion of the thread adjacent said pilot edge and greater than the crest diameter of the portion of the thread remote from said pilot edge whereby when a conduit having a diameter intermediate the large and small diameters of said thread is inserted into said end of said connector the pilot edge cooperates with said thread to axially align the connector and conduit preparatory to screwing the conduit into said connector.

3. The connector claimed in claim 2 having a rolled pilot edge which is spaced from the starting turn of said internal helical thread.

4. The connector claimed in claim 3 having a circumferential internal shoulder adjacent the finish turn of said thread, the internal diameter of said shoulder being less than the internal diameter of said pilot edge.

5. In combination a connector comprising a tubular member having means thereon for attaching it to a supporting structure, such as an outlet box, and also having an internal thread substantially uniformly tapered axially of said member, the starting turn of said thread being spaced from one end of said connector, the internal diameter of said end of the connector being smaller than the crest diameter of the adjacent starting turn of said tapered thread and greater than the crest diameter of the turn of said tapered thread remote from said end, a tubular conduit inserted into said end of said tubular member and having a screw fit with the internal thread of said connector and having an external diameter substantially the same as the internal diameter of the said end of said connector whereby the connector provides a two point support for the conduit.

6. In combination a connector comprising a tubular member having means thereon for attaching it to a supporting structure, such as an outlet box, and also having an internal helical thread substantially uniformly tapered axially of said member, the diameter of said helical thread decreasing axially inwardly from end of said connector, the said end of said connector having a circumferential pilot edge which serves as a pilot for guiding a conduit to said thread, said circumferential pilot edge having a diameter which is less than the crest diameter of the portion of the thread adjacent said pilot edge and greater than the crest diameter of the portion of the thread remote from said pilot edge, a plain tubular conduit having an external diameter substantially the same as the internal diameter of said pilot edge turned into said tapered thread from said end of said tubular member and supported in said connector by the thread and pilot edge.

7. The connector claimed in claim 6 wherein the circumferential pilot edge of the said tubular member consists of a ring press fitted in the end of said tubular member.

PAUL A. MUNDY.
CHARLES A. BASHFORD.

REFERENCES CITED

The following references are of record in the file of this patent:

UNITED STATES PATENTS

| Number | Name | Date |
|---|---|---|
| 91,291 | Wegman | June 15, 1869 |
| 1,965,856 | Petersen | July 10, 1934 |
| 2,038,312 | Petersen | Apr. 21, 1936 |
| 2,304,244 | Criner | Dec. 8, 1942 |